(12) United States Patent
Roth et al.

(10) Patent No.: US 8,166,457 B2
(45) Date of Patent: Apr. 24, 2012

(54) METHOD AND SYSTEM FOR IMPLEMENTING A COMPLETE SAP SYSTEM LANDSCAPE ON IBM SYSTEM I

(75) Inventors: Barbara Susanne Roth, Walldorf (DE); James E. Anderson, Rochester, MN (US); Michael Bernd Koerner, Pliezhausen (DE); Ron Schmerbauch, Rochester, MN (US); Manfred Hoeschele, Althengstett (DE); Christian Bartels, Dossenheim (DE)

(73) Assignee: International Business Machines Corporation, Armonk, NY (US)

( * ) Notice: Subject to any disclaimer, the term of this patent is extended or adjusted under 35 U.S.C. 154(b) by 1059 days.

(21) Appl. No.: 12/059,963

(22) Filed: Mar. 31, 2008

(65) Prior Publication Data

US 2009/0249278 A1 Oct. 1, 2009

(51) Int. Cl.
*G06F 9/44* (2006.01)
(52) U.S. Cl. ......................... 717/121; 717/101
(58) Field of Classification Search .................. 717/121, 717/168–178, 101
See application file for complete search history.

(56) References Cited

U.S. PATENT DOCUMENTS

| | | | |
|---|---|---|---|
| 7,231,662 B2 | 6/2007 | Wissenbach | |
| 7,721,257 B2 * | 5/2010 | Demuth et al. | 717/120 |
| 7,725,891 B2 * | 5/2010 | Demuth et al. | 717/168 |
| 7,877,730 B2 * | 1/2011 | Demuth et al. | 717/117 |
| 7,926,056 B2 * | 4/2011 | Lier et al. | 718/102 |
| 2004/0243772 A1 * | 12/2004 | Wissenbach | 711/152 |
| 2006/0030315 A1 * | 2/2006 | Smith et al. | 455/432.3 |
| 2007/0240154 A1 * | 10/2007 | Gerzymisch et al. | 717/174 |
| 2009/0249278 A1 * | 10/2009 | Roth et al. | 717/101 |

* cited by examiner

*Primary Examiner* — Li Zhen
*Assistant Examiner* — Marina Lee
(74) *Attorney, Agent, or Firm* — McGinn Intellectual Property Law Group, PLLC

(57) ABSTRACT

A method of implementing a complete SAP system landscape on IBM System i is provided. This method involves preselecting at least one value-added reseller (VAR) for participation in implementing the complete SAP system landscape on IBM System i. The VAR then selects values for flexible parameters according to needs of a customer. The flexible parameters include languages for i5/OS and SAP, an amount of SAP ERC Central Component (ECC) systems ranging from one to three, an inclusion of a SAP Solution Manager, a client landscape, a configuration of SAP systems, and a level of software stack. The level of software stack includes a layer of the SAP systems, a layer implementing country-specific configuration, a layer implementing industry-specific configuration, and a layer of VAR added value. Media is created and implemented with the specified content at a factory using standard SAP procedures. A full backup of the SAP systems is then created using standard i5/OS operating system imaging. The media is restored by the VAR using the standard i5/OS operating system imaging at multiple customer sites. The VAR only need be an i5/OS system administrator having no knowledge about SAP on IBM System i to perform the operation. The VAR communicates feedback to the factory for improving the specified content.

1 Claim, 4 Drawing Sheets ns. Images containing SAP software are typically only available for Windows or Unix-based operating systems. The object-based architecture, integrated database, and binary incompatibility prevent the image content to be executed on IBM System i.
METHOD AND SYSTEM FOR IMPLEMENTING A COMPLETE SAP SYSTEM LANDSCAPE ON IBM SYSTEM I

BACKGROUND OF THE INVENTION

1. Field of the Invention

The present invention generally relates to a method and system for implementing a complete SAP pre-configured system landscape in one step, and more particularly to a method and system for implementing a complete SAP system landscape in one day, using only standard i5/OS system administration knowledge.

2. Description of the Related Art

SAP software is commonly implemented in many different types of business environments. In order to use SAP's software productively, the implementers have to go through many steps of planning, preparation, deployment, post-installation, configuration and customization. Today's software consists of many units that have to be installed and updated separately. As systems have become integrated, software is no longer standalone, but part of a bigger system landscape.

In the case of implementing SAP on IBM System i, both i5/OS and SAP system landscape knowledge are necessary. This skill is not very widespread in many parts of the world. Installation and patching of the operating system, database, and SAP application software takes several weeks before the system can be used productively. The process is fragile and error-prone. All implementation work for the operating system and database on IBM System i is usually done by an IBM System i system administrator. After that, a SAP on IBM System i certified consultant implements the desired SAP system landscape and configures the system according to the customer's needs.

The installation process for SAP on IBM System i for the current release—SAP ERP 2005, SAP ECC 6.0, SAP NetWeaver 7.0—requires intimate knowledge of the necessary tools to implement the system. The standard installation for SAP systems is based on the SAP-owned tool "SAPinst". As IBM System i provides no graphical user interface, SAPinst, in its version for SAP ERP 2005, cannot run directly on IBM System i, but requires a helper tool, TMKSVR. For IBM System i, SAPinst has been adjusted to use a client-server architecture, where SAPinst sends requests to the TMKSVR and the TMKSVR then forwards those requests to the System i host.

The procedure has to be repeated once per SAP system that has to be installed in the system landscape. SAP recommends a minimum system landscape of three SAP systems per product: a development system to implement changes, a quality assurance system to control and test the changes, and a productive system where end users work on. In addition, for support reasons, SAP has made an additional, separate SAP Solution Manager system mandatory. FIG. 1 shows the SAP system landscape as recommended by SAP.

Another exemplary concern of implementing SAP on IBM system i regards disk imaging. Creating complete disk images of all hard drives of a computer is a common backup procedure. IBM i5/OS provides several save and restore-related procedures in its GO SAVE and GO RESTORE menus.

However, the SAP Best Practices development team provides an image containing one SAP system—as opposed to a complete system landscape—with one specific pre-configured SAP Best Practice package for demo purposes. Value-added resellers (hereinafter "VARs") have no influence on this image. That is, VARs knowledge about the customers of their region or industry is not used.

The Demo Image is only available to customers that already run SAP on Microsoft SQL Server for licensing reasons. Images containing SAP software are typically only available for Windows or Unix-based operating systems. The object-based architecture, integrated database, and binary incompatibility prevent the image content to be executed on IBM System i.

In addition, images are usually provided containing only one standalone system to be set up for demonstration purposes, to explain features of the SAP applications or to explore their functional scope, but not for productive use. Further, as the systems are prepared for demo purposes, they are not set up for a certain market or target group. For example, they usually only contain the English language.

SUMMARY OF THE INVENTION

In view of the foregoing and other exemplary problems, drawbacks, and disadvantages of the conventional methods and structures, an exemplary feature of the present invention is to provide a method and structure which allows a system administrator to implement a complete SAP system landscape in one day with pure i5/OS system administrator knowledge using the standard i5/OS restore procedure.

In an aspect of the present invention, a method of implementing a complete SAP system landscape on IBM System i includes preselecting at least one value-added reseller (VAR) for participation in implementing said complete SAP system landscape on IBM System i, selecting values for flexible parameters, the values selected by the VAR according to needs of a customer, the flexible parameters including languages for i5/OS and SAP, an amount of SAP ERC Central Component (ECC) systems ranging from one to three, an inclusion of a SAP Solution Manager, a client landscape, a configuration of SAP systems, and a level of software stack, including a layer of the SAP systems, a layer implementing country-specific configuration, a layer implementing industry-specific configuration, and a layer including VAR added value, creating media with specified content at a factory using standard SAP procedures, the specified content including the flexible parameters and a set of fixed parameters, implementing the SAP systems according to specification while at the factory, creating a full backup of the SAP systems using standard i5/OS operating system imaging, restoring the media using the standard i5/OS operating system imaging at multiple customer sites, the restoring performed by the VAR such that the VAR only need be an i5/OS system administrator having no knowledge about SAP on IBM System i, and implementing feedback provided by said VAR to said factory for improving said specified content.

According to the present invention, instead of installing i5/OS and each SAP system step-by-step, the media provide a completely installed landscape of one to three SAP ECC systems and the mandatory SAP Solution Manager.

In addition, using the i5/OS restore procedure, the machine can be setup and prepared by a System i administrator to be handed over directly to an SAP consultant with no platform-dependent skills. The scarce SAP on System i implementation skill is not needed.

Further, using a common denominator of SAP configuration and customization for a specific small and medium businesses target group, the media get created once to be restored many times at multiple customer sites. Every restore takes about a day, so, for every restore, days to several weeks of implementation time and budget can be saved. It is expected that 70-90% of the configuration and customization time for a specific customer can be saved by using this approach.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 2:
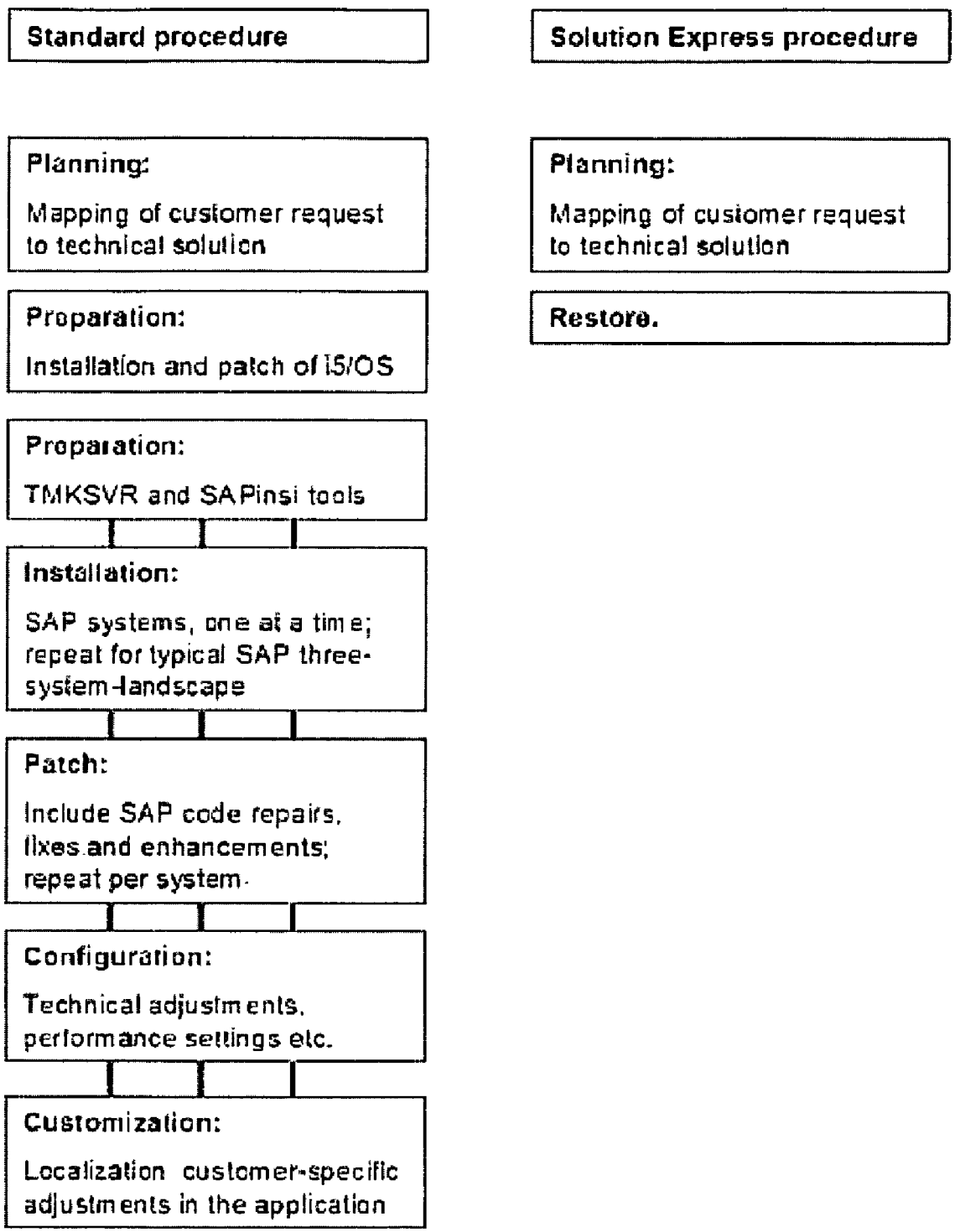
FIG. 2 illustrates a comparison between a configured and customized SAP system landscape using the conventional procedure and an exemplary embodiment of the procedure of the present invention.
Figure 3:
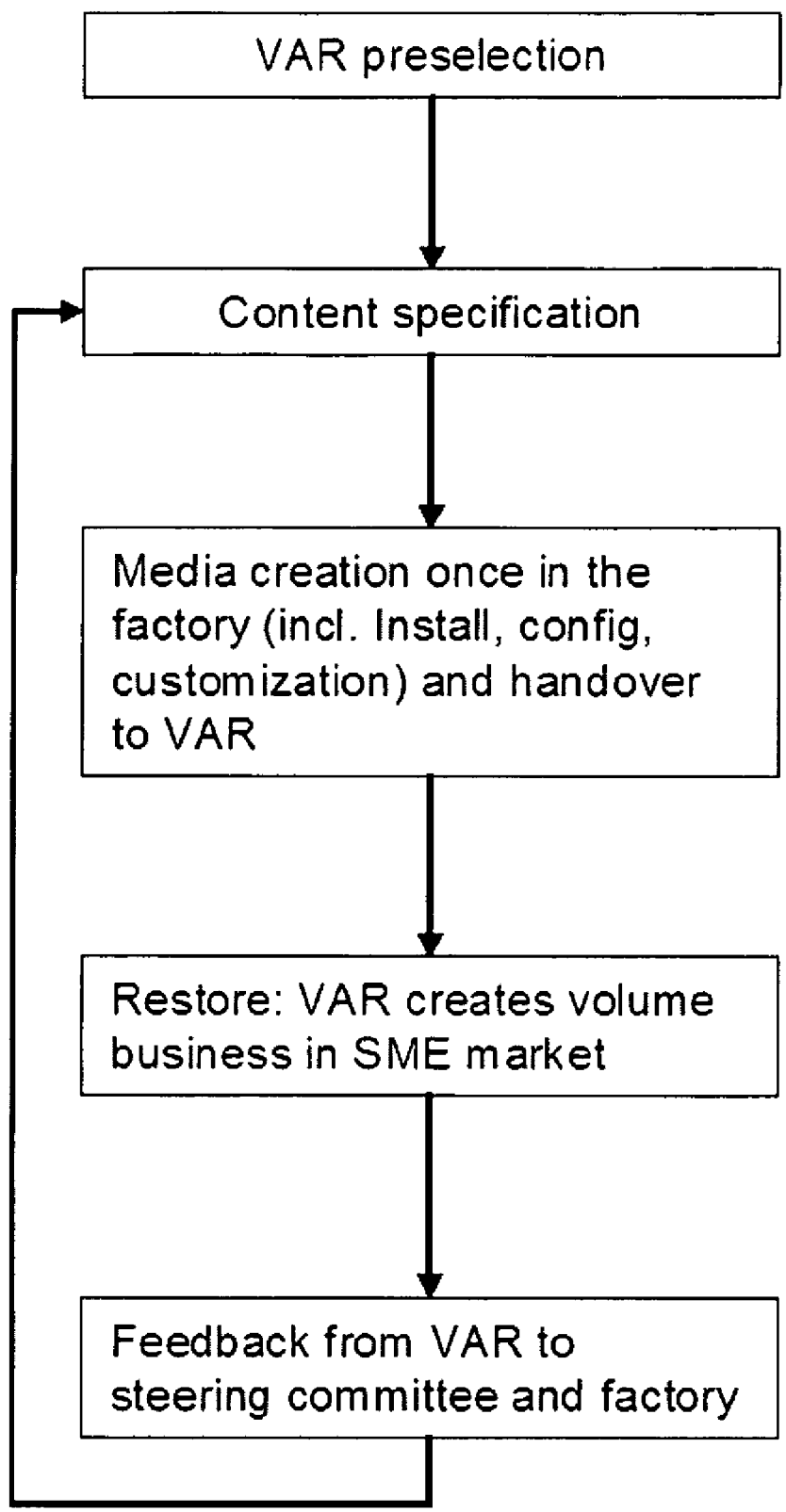
FIG. 3 illustrates an overview of the method of the present invention.
Figure 4:
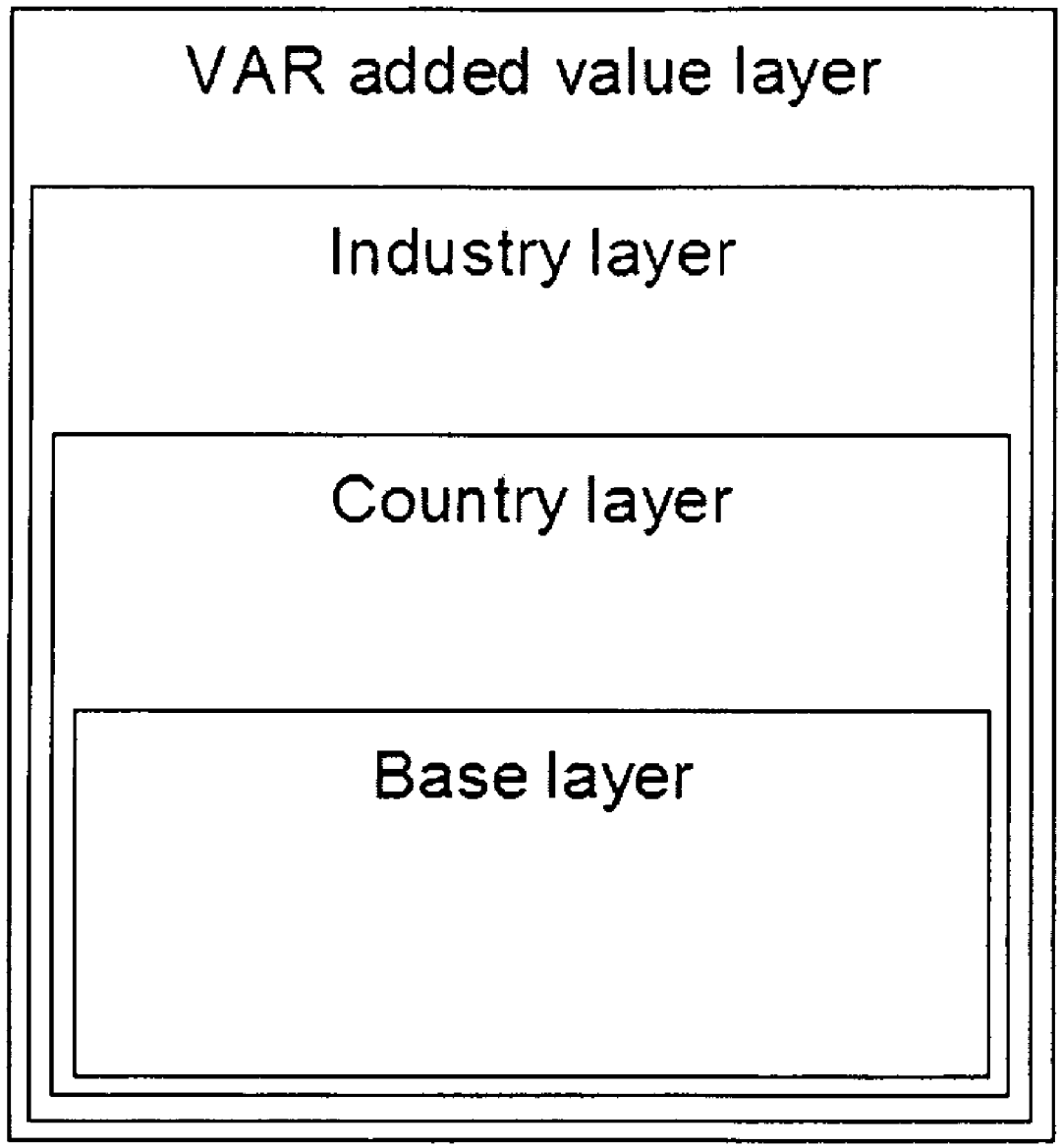
FIG. 4 illustrates the image layers that are implemented by the present invention.

Referring now to the drawings, and more particularly to FIGS. 2-4, there are shown exemplary embodiments of the method and structures according to the present invention.

The Solution Express procedure described herein was established to create volume business in the SAP on System i small and medium business segment. The Solution Express procedure provides a customer with a configured and customized complete SAP system landscape in a much shorter amount of time than is possible using the conventional method.

Instead of repeating the standard procedure once per SAP system again and again for every customer at the customer site, the standard procedure is executed only once at the tape factory. The VAR then uses the image with the ready-to-run content and restores it once per customer at the customer site. The typical implementation time for the present invention is a few days, whereas the typical implementation time for the conventional method is a few weeks.

FIG. 3 provides a managerial overview of the method. At first, the VARs participating in the Solution Express procedure are preselected by the program committee. Selection criteria include in-house System i and SAP skill, or established relationship to a partner with those skills, a business case that explains the targeted region, industry, and possible prospects, and expected reuse of the media in many customer contexts. In the case where there are too many requests for images to be produced, a program committee decides what image to be implemented first or at all.

After the VAR has been selected for the procedure, they have to answer a questionnaire about the media content in order to specify the content of the image to be used. That is, the VAR and the tape factory come to a common understanding of what needs to be implemented. When the content of the image is discussed with the VAR, the VAR is provided with a description of typical layers, that is, e.g. options that might be a fit for the particular region being targeted. A questionnaire supports the VAR in the choice of the right layer and the content of that layer (for example, a country-specific layer could be specific to France, Brazil or Australia).

This specification of media content includes a number of parameters. There are several parameters that are fixed, such as i5/OS with integrated IBM DB2 for i5/OS, SAP Release ERP 2005 based components (SAP's strategic go-to release until 2010, ECC 6.0 Unicode), and hostnames, system IDs, and instance numbers. There are other parameters that are flexible, such as languages for i5/OS and SAP (localization), number of SAP ERC Central Component (ECC) systems (one to three), inclusion of SAP Solution Manager (yes/no), client landscape, configuration of SAP systems, and level of software stack, including a layer of SAP systems, a layer of implementation of country- or industry-specific SAP Best Practices, and a layer of VAR added value implementation. The VAR specifies the parameters using the VAR's knowledge about the customers of the region and industry being targeted.

The VAR can generally select software stack layers that should be included. FIG. 4 exemplarily shows the layers that are implemented. The base layer contains only the operating system, the database, and the installed SAP systems at a current patch level. The country-specific layer contains preconfigured generic business scenarios, such as organizational structure, basic financials, basic controlling, production, basic sales, and distribution. The industry-specific layer provides business scenarios based on the specific requirements of that industry (for example, Automotive, High Tech etc.). The VAR added value layer contains additional business logic implemented and owned by that VAR for the VAR's customers in the VAR's region and industry.

Each layer includes the lower layers and, thus, is fully functional. The more layers that are implemented leads to the more customization available, making the software stack more specific. The VARs can directly input their knowledge about the customers in their region and industry.

After the questionnaire has been completed, the factory creates the specified media content using standard SAP procedures (installation or system copy) shown in FIG. 2. The i5/OS operating system (including the integrated IBM DB2 for i5/OS database) and several SAP systems are installed on a source machine locally in the factory. All steps of the implementation that would need to be repeated by a local consultant for each customer (like a common denominator) can be put on media. Typical configuration and customization steps that would be repeated at most of the customer sites can be integrated in the media content. This is compliant with SAP's current approach to provide meaningful content suitable for many customers instead of customizing a system for each customer, the latter of which tends to be costly.

When all SAP systems have been implemented according to the specifications in the factory (which takes between three days and several weeks), a full backup of the system is put on media using standard i5/OS operating system imaging. The factory then ships the image to the VAR. The VAR does not have to repeat the standard procedure, but can directly restore the image in one day using operating system means. With every restore, the VAR saves the time needed to create an image using the standard procedure.

The VAR restores the media using standard i5/OS operating system imaging at multiple customer sites. This can be done by an i5/OS system administrator, thus no knowledge about SAP on System i installation or implementation is necessary. At the customer site, the i5/OS system administrator restores the content of the media on an empty machine.

Every restore takes about a day, so, for every restore, days to several weeks of implementation time and budget can be saved. It is expected that 70-90% of the configuration and customization time for a specific customer can be saved by using this approach. After installing valid licenses, the SAP systems are immediately accessible.

After the VAR has gained experience with the approach, the VAR provides feedback to the factory to improve the image content.

Figure 1:
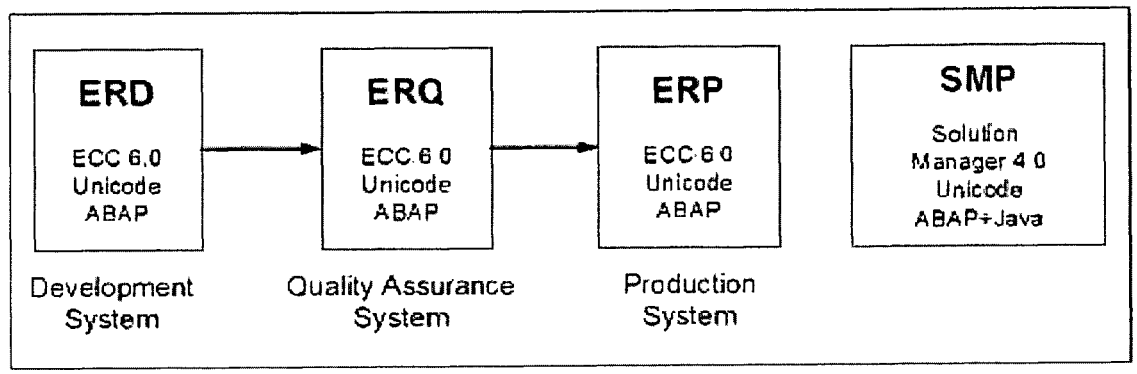
FIG. 1 illustrates the minimum SAP three-system landscape as recommended by SAP.

FIG. 2 shows a comparison of the time needed by a conventional minimum SAP three-system and a system of the present invention to come to the same result. The left side depicts the large amount of time needed to set up a configured and customized complete SAP system landscape using the standard procedure. The standard procedure is based on the tools that are provided by SAP and IBM to all of their customers and partners. It is a lengthy procedure that has to be repeated once per SAP system, that is, in a landscape as described in FIG. 1, four times.

The exemplary Solution Express procedure of the present invention successfully presumes that there are many steps in setting up an SAP landscape that are independent of the specific customer and are specific only to a country, industry, or other variable. Instead of repeating multiple steps, as does the conventional procedure during the installation, configuration, and customization of up to four SAP systems (see FIG. 1), the VAR only has to execute one step (restore) to recreate the fully implemented landscape. The standard procedure still has to be executed once in the factory, but will not have to be repeated by the VAR for every single customer. The factory takes into account country- and industry-specific parameters to configure existing SAP and IBM software.

Therefore, the software product is installed with all the client requirements at a source machine locally i.e. outside client site. During installation all the configurations specific to the landscape of the client site is taken into account. At the end, a new software product is generated which is now client specific. Such client specific software product is then shipped to the client to be easily installed without implying high skill and possible shutdown.

Therefore, instead of installing i5/OS and each SAP system step-by-step, the media provide a completely installed SAP landscape of one to three SAP ECC systems and the mandatory SAP Solution Manager.

In addition, using the i5/OS restore procedure, the machine can be setup and prepared by a System i administrator to be handed over directly to an SAP consultant with no platform-dependent skills. The scarce SAP on System i implementation skill is not needed.

Further, using a common denominator of SAP configuration and customization for a specific small and medium businesses target group, the media get created once to be restored many times at multiple customer sites.

The procedure is explained exemplary in the context of IBM i5/OS and SAP software, but can be used in any complex environment. For example, the procedure is available for situations where it is necessary to decide on specific configuration and create a landscape of multiple components that are not meaningful on their own, but are meaningful when integrated using a suitable configuration and customization.

While the invention has been described in terms of several exemplary embodiments, those skilled in the art will recognize that the invention can be practiced with modification within the spirit and scope of the appended claims. Further, it is noted that, Applicant's intent is to encompass equivalents of all claim elements, even if amended later during prosecution.

What is claimed is:

1. A method of implementing a complete business management software system landscape on an integrated operating environment, comprising:
  preselecting at least one value-added reseller (VAR) for participation in implementing said complete business management software system landscape on said integrated operating environment;
  selecting values for flexible parameters, said values selected by said VAR according to needs of a customer, said flexible parameters comprising:
    languages for an operating system of said integrated operating environment and said complete business management software system landscape;
    an amount of system landscape ERC Central Component (ECC) systems ranging from one to three;
    an inclusion of a system landscape Solution Manager;
    a client landscape;
    a configuration of system landscape systems; and
    a level of software stack, comprising:
      a layer of said system landscape systems;
      a layer implementing country-specific configuration;
      a layer implementing industry-specific configuration; and
      a layer comprising VAR added value;
  creating media with specified content at a factory using standard system landscape procedures, said specified content including said flexible parameters and a set of fixed parameters;
  implementing said system landscape systems while at said factory;
  creating a full backup of said system landscape systems using standard operating system imaging;
  restoring said media using said standard operating system imaging at multiple customer sites, said restoring performed by said VAR such that said VAR only need be an operating system administrator having no knowledge about system landscape on said integrated operating environment; and
  implementing feedback provided by said VAR to said factory,
  wherein the factory considers country-specific and industry specific parameters to configure software for the system landscape and the integrated operating environment.

* * * * *

UNITED STATES PATENT AND TRADEMARK OFFICE
Certificate

Patent No. 8,166,457 B2                                                                          Patented: April 24, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Barbara Susanne Roth, Walldorf (DE); James E. Anderson, Rochester, MN (US); Michael Bernd Koerner, Pliezhausen (DE); Ron Schmerbauch, Rochester, MN (US); Manfred Hoeschele, Althengstett (DE); Christian Bartels, Dossenheim (DE); and Brian E. Clark, Ashfield, MA (US).

Signed and Sealed this Twenty-fifth Day of November 2014.

<div style="text-align:right">
DON WONG<br>
<i>Supervisory Patent Examiner</i><br>
Art Unit 2198<br>
Technology Center 2100
</div>